United States Patent
Holland et al.

(10) Patent No.: US 10,261,632 B2
(45) Date of Patent: Apr. 16, 2019

(54) SYSTEMS AND METHODS FOR INSERTING INTRA-FRAME PAUSE

(71) Applicant: Apple Inc., Cupertino, CA (US)

(72) Inventors: Peter F. Holland, Los Gatos, CA (US); Christopher P. Tann, San Jose, CA (US); Malcolm D. Gray, Sunnyvale, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 15/655,560

(22) Filed: Jul. 20, 2017

(65) Prior Publication Data
US 2018/0081491 A1    Mar. 22, 2018

Related U.S. Application Data

(60) Provisional application No. 62/398,391, filed on Sep. 22, 2016.

(51) Int. Cl.
| | |
|---|---|
| *G06F 3/041* | (2006.01) |
| *G09G 5/36* | (2006.01) |
| *G09G 5/12* | (2006.01) |
| G09G 3/20 | (2006.01) |
| G09G 3/36 | (2006.01) |

(52) U.S. Cl.
CPC .......... *G06F 3/0418* (2013.01); *G06F 3/0416* (2013.01); *G09G 5/12* (2013.01); *G09G 5/363* (2013.01); *G09G 3/2011* (2013.01); *G09G 3/3648* (2013.01); *G09G 2310/08* (2013.01); *G09G 2320/0233* (2013.01); *G09G 2354/00* (2013.01); *G09G 2360/12* (2013.01)

(58) Field of Classification Search
CPC .... G06F 3/0418; G06F 3/0416; G06F 3/2011; G06F 3/3648; G09G 5/12; G09G 5/363; G09G 2310/08; G09G 2320/0233; G09G 2354/00; G09G 2360/12
See application file for complete search history.

(56) References Cited

U.S. PATENT DOCUMENTS

| | | | |
|---|---|---|---|
| 9,041,685 B2 | 5/2015 | Lillie et al. | |
| 9,223,449 B2 | 12/2015 | Lee | |
| 9,268,437 B2 | 2/2016 | Saitoh et al. | |
| 2013/0314361 A1* | 11/2013 | Saitoh | G06F 3/0412 345/173 |
| 2014/0071062 A1 | 3/2014 | Fang | |
| 2016/0259478 A1 | 9/2016 | Wang et al. | |

FOREIGN PATENT DOCUMENTS

WO    2015/131467 A1    9/2014

* cited by examiner

*Primary Examiner* — Stephen G Sherman
(74) *Attorney, Agent, or Firm* — Fletcher Yoder PC

(57) ABSTRACT

One embodiment describes an electronic display that includes display driver circuitry that displays at least a first image frame and a second image frame on the electronic device using a first display pixel and a second display pixel. A timing controller of the electronic display determines at least a first insertion time for a first intra-frame pause for the first image frame and a second insertion time for a second intra-frame pause for the second image frame, which pause rendering of image data to allow the touch sensing circuitry to detect user interaction. The insertion times for the first and second intra-frame pauses are varied from one another by a determined step size.

20 Claims, 11 Drawing Sheets

SYSTEMS AND METHODS FOR INSERTING INTRA-FRAME PAUSE

CROSS REFERENCE TO RELATED APPLICATIONS

This application is a Non-Provisional Patent Application of U.S. Provisional Patent Application No. 62/398,381, entitled "Systems and Methods for Inserting Intra-Frame Pause", filed Sep. 22, 2016, which is herein incorporated by reference in its entirety and for all purposes.

BACKGROUND

The present disclosure relates generally to electronic displays, and more particularly, to artifact compensation for touch-sensitive electronic displays.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, an electronic display may enable information to be communicated to a user by displaying visual representations of the information, for example, as pictures, text, or videos. More specifically, the visual representations may be displayed as successive static image frames. In some embodiments, each image frame may be displayed by successively writing image data to rows of pixels in the electronic display.

In addition to outputting information, the electronic display may enable the user to communicate information to the electronic display and/or a computing system that includes the electronic display. For example, the electronic display may be a touch-sensitive display, which may detect a user touch on the surface of the electronic display. More specifically, the electronic display may detect occurrence and/or position of the user touch based at least in part on an impedance (e.g., capacitance) change in the electronic display caused by the user touch.

However, at any given time, the electronic display may generally either write image data to the display pixels or check for an impedance change via touch sensing, but not both. Thus, when image data is being written to the pixels, a user touch may be undetected. Similarly, when checking for impedance changes via touch sensing, the electronic display may stop writing image data. As such, in operation, the electronic display may alternate between writing image data to the pixels and checking for a user touch. Moreover, the touch detection accuracy may depend at least in part on frequency the electronic display checks for impedance changes. However, punctuating the writing of the image data with a greater number of touch sensing impedance checks could introduce perceivable artifacts and/or stress rows of pixels.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving touch detection accuracy of touch-sensitive electronic displays. More specifically, the touch detection accuracy may be improved by increasing frequency an electronic display checks for a user touch. In fact, the electronic display may alternate between writing portions of image frames with checking for user touch. For example, the electronic display may write a first portion of an image frame to pixels in the electronic display, pause the writing of the image frame, check for a user touch, and write a second portion of the image frame to the pixels. As used herein, pausing the writing of an image frame to check for a user touch is generally referred to as an "intra-frame pause."

However, pausing in the middle writing of an image frame may cause perceivable visual artifacts on the electronic display, particularly when the desired brightness level (e.g., grayscale value) between successively displayed image frames is changing. More specifically, an intra-frame pause may cause a small delay between writing the first portion of the image frame and writing the second portion of the image frame. In some embodiments, when the successively displayed image frames are changing brightness level (e.g., grayscale value), the delay may cause the brightness of the second portion to be perceptively different from the first portion even when both portions are supposed to be displaying the same brightness level. For example, when the brightness is increasing, the second portion may be displayed darker than desired. On the other hand, when the brightness is decreasing, the second portion may be displayed brighter than desired. The perceptibility of these artifacts may be accentuated when the delay occurs at the same frame rendering position for successive frames.

Accordingly, in some embodiments, timing of the intra-frame pauses may be varied during the rendering of each frame. In this manner, since a human eye generally averages the brightness level of a pixel over short durations of time (e.g., time to write one image frame), adjusting the location of intra-frame pauses may reduce the perception of intra-frame pause induced artifacts.

BRIEF DESCRIPTION OF THE DRAWINGS

Various aspects of this disclosure may be better understood upon reading the following detailed description and upon reference to the drawings in which.

DETAILED DESCRIPTION

Figure 1:
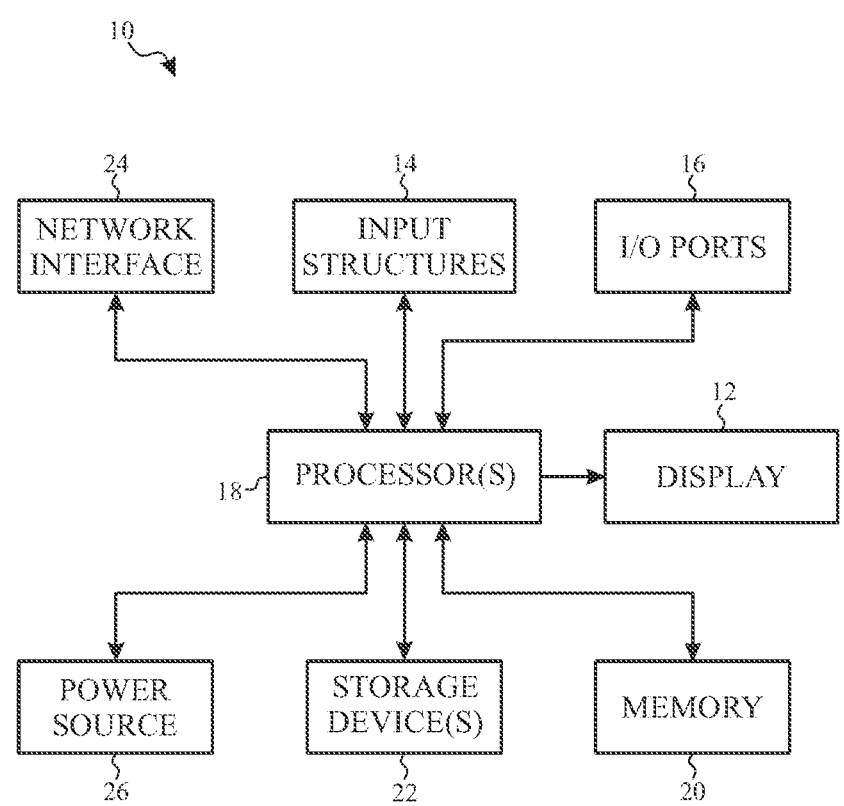
FIG. 1 is a block diagram of a computing device, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, a touch-sensitive electronic display may enable both the output of information to a user from a computing system as well as the input of control commands from the user to the computing system. More specifically, the electronic display may write image data to pixels to display visual representations of the information. Additionally, the electronic display may detect a user touch by checking for changes in impedance (e.g., capacitance) caused by the user touch on the surface of the electronic display.

Generally, an electronic display may alternate between writing image data and checking for a user touch. For example, the electronic display may write an entire image frame to the display pixels, check for a user touch, and repeat. However, at one time, the electronic display may only perform one of writing image data or checking for impedance changes. In other words, when the electronic display is writing image data to the pixels, a user touch during that period may go undetected.

Accordingly, to improve the user touch detection, the frequency the electronic display checks for a user touch may be increased. For example, the electronic display may write a first portion of an image frame, pause the writing of the image frame, check for an impedance change, write a second portion of the image frame, pause the writing of the image frame, check for an impedance change, and so on. As used herein, pausing the writing of an image frame to check for a user touch is generally referred to as an "intra-frame pause." Indeed, multiple intra-frame pauses may be inserted into a signal frame of image data written to the electronic display. In this manner, intra-frame pauses may enable the frequency the electronic display checks for a user touch to be increased, which may improve user touch detection accuracy.

However, the intra-frame pause between writing portions of an image frame may cause perceivable visual artifacts. As will be described in more detail below, artifacts may be more likely perceivable when placed at the same render time of successively displayed image frames. More specifically, artifacts may be accentuated by appearing in the same location of a frame, due to the intra-frame pause occurring at a common time during frame rendering of successive frames.

Accordingly, one embodiment of the present disclosure describes an electronic display that reduces the likelihood of perceivable visual artifacts by compensating for an intra-frame pause. As will be described in more detail below, the electronic display may include a timing controller (TCON) that varies a timing of the intra-frame pauses for successive frames by rolling the insertion time of the intra-frame pauses. Accordingly, any artifacts resulting from the intra-frame pauses will also be displayed in varied locations of successive frames.

In perceiving the visual representations displayed on the electronic display, a user's eyes generally average the brightness level of a pixel across a short period of time (e.g., time used to write an image frame). As such, the user's eyes may average out undesired brightness levels caused by the intra-frame pause with the adjusted brightness level to perceive the desired brightness levels, especially when the artifacts are provided in varying areas of successive frames. Thus, the techniques described herein may enable an electronic display to improve user touch detection accuracy while minimizing the likelihood of perceivable visual artifacts. To help illustrate, a computing device 10 that utilizes a touch-sensitive electronic display 12 is described in FIG. 1. As will be described in more detail below, the computing device 10 may be any suitable computing device, such as a handheld computing device, a tablet computing device, a notebook computer, and the like.

Accordingly, as depicted, the computing device 10 includes the display 12, input structures 14, input/output (I/O) ports 16, one or more processor(s) 18 (e.g., a processor core complex), memory 20, nonvolatile storage 22, a network interface 24, and a power source 26. The various components described in FIG. 1 may include hardware elements (including circuitry), software elements (including computer code stored on a non-transitory computer-readable medium), or a combination of both hardware and software elements. It should be noted that FIG. 1 is merely one example of a particular implementation and is intended to illustrate the types of components that may be present in the computing device 10. Additionally, it should be noted that the various depicted components may be combined into fewer components or separated into additional components. For example, the one or more processors 18 may include a graphical processing unit (GPU).

As depicted, the processor 18 is operably coupled with memory 20 and/or nonvolatile storage device 22. More specifically, the processor(s) 18 may execute instruction stored in memory 20 and/or non-volatile storage device 22 to perform operations in the computing device 10, such as outputting image data to the display 12. As such, the processor 18 may include one or more general purpose microprocessors, one or more application specific processors (ASICs), one or more field programmable logic arrays (FPGAs), or any combination thereof. Additionally, memory 20 and/or non volatile storage device 22 may be a tangible, non-transitory, computer-readable medium that stores instructions executable by and data to be processed by the processor(s) 18. In other words, the memory 20 may include random access memory (RAM) and the non-volatile storage device 22 may include read only memory (ROM), rewritable flash memory, hard drives, optical discs, and the like. By way of example, a computer program product containing the instructions may include an operating system or an application program.

Additionally, as depicted, the processor 18 is operably coupled with the network interface 24 to communicatively couple the computing device 10 to a network. For example, the network interface 24 may connect the computing device 10 to a personal area network (PAN), such as a Bluetooth network, a local area network (LAN), such as an 802.11x Wi-Fi network, and/or a wide area network (WAN), such as a 4G or LTE cellular network. Furthermore, as depicted, the processor 18 is operably coupled to the power source 26, which provides power to the various components in the computing device 10. As such, the power source 26 may include any suitable source of energy, such as a rechargeable lithium polymer (Li-poly) battery and/or an alternating current (AC) power converter.

As depicted, the processor 18 is also operably coupled with I/O ports 16, which may enable the computing device 10 to interface with various other electronic devices, and input structures 14, which may enable user interaction with the computing device 10. Accordingly, the inputs structures 14 may include buttons, keyboards, mice, trackpads, and the like. In addition to the input structures 14, the display 12 may include touch sensing components to enable user inputs via user touches to the surface of the display 12. In fact, in some embodiments, the electronic display 12 may detect multiple user touches at once.

In addition to enabling user inputs, the display 12 may display visual representations via one or more static image frames. In some embodiments, the visual representations may be a graphical user interface (GUI) for an operating system, an application interface, text, a still image, or a video. As depicted, the display 12 is operably coupled to the processor 18, which may enable the processor 18 (e.g., image source) to output image data to the display 12.

Based on the received image data, the display 12 may then write image frames to the display pixels in the display 12 to display a visual representation. As will be described in more detail below, once the display 12 receives the image data, additional processing may be performed on the image data to further improve the accuracy of the viewed visual representation. For example, the display 12 (or other component controlling visualizations of the display 12) may vary timing of intra-frame pauses (e.g., by rolling intra-frame pause insertion times) to reduce the likelihood of perceivable visual artifacts caused by these intra-frame pauses.

Figure 2:
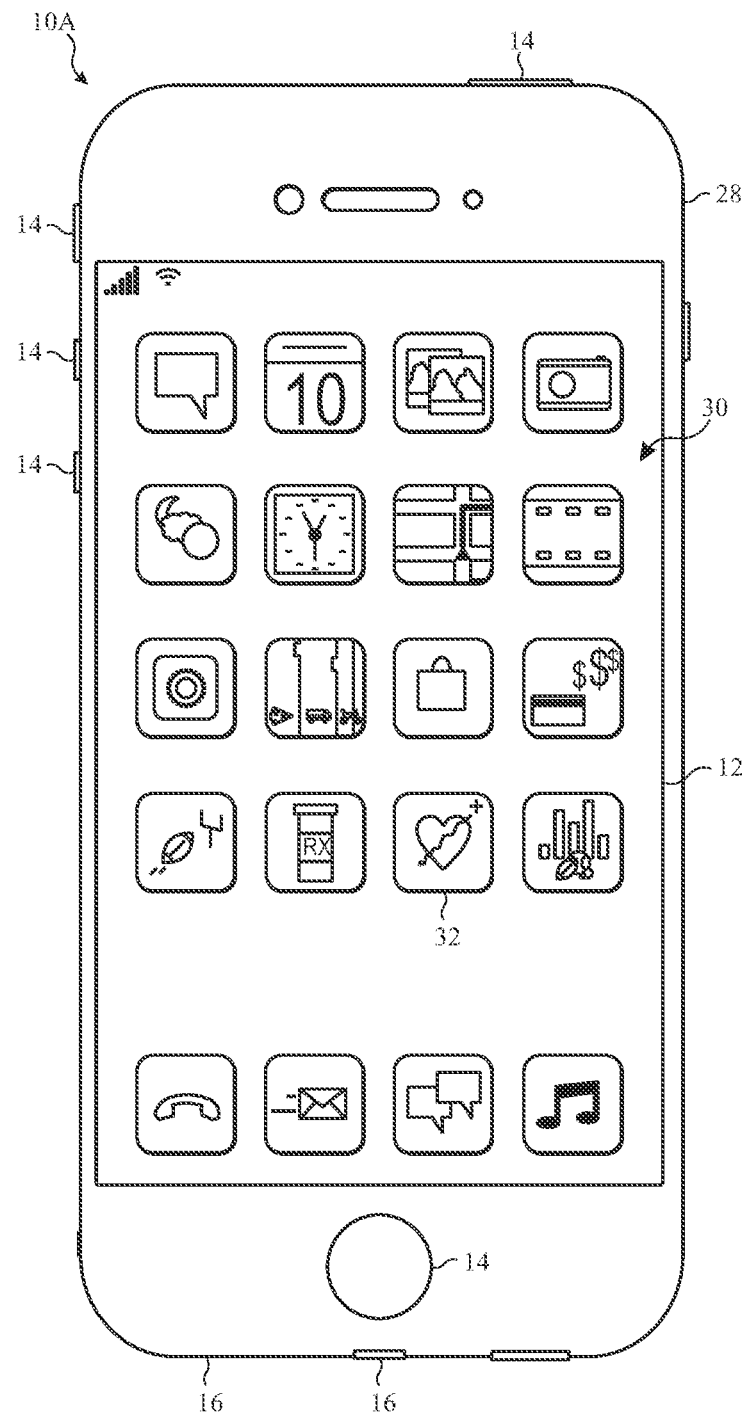
FIG. 2 is an example of the computing device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be any iPhone model from Apple Inc. of Cupertino, Calif.

As depicted, the handheld device 10A includes an enclosure 28, which may protect interior components from physical damage and to shield them from electromagnetic interference. The enclosure 28 may surround the display 12, which, in the depicted embodiment, displays a graphical user interface (GUI) 30 having an array of icons 32. By way of example, when an icon 32 is selected either by an input structure 14 or a touch sensing component of the display, an application program may launch.

Additionally, as depicted, input structure 14 may open through the enclosure 28. As described above, the input structures 14 may enable a user to interact with the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Furthermore, as depicted, the I/O ports 16 open through the enclosure 28. In some embodiments, the I/O ports 16 may include, for example, an audio jack to connect to external devices.

Figure 3:
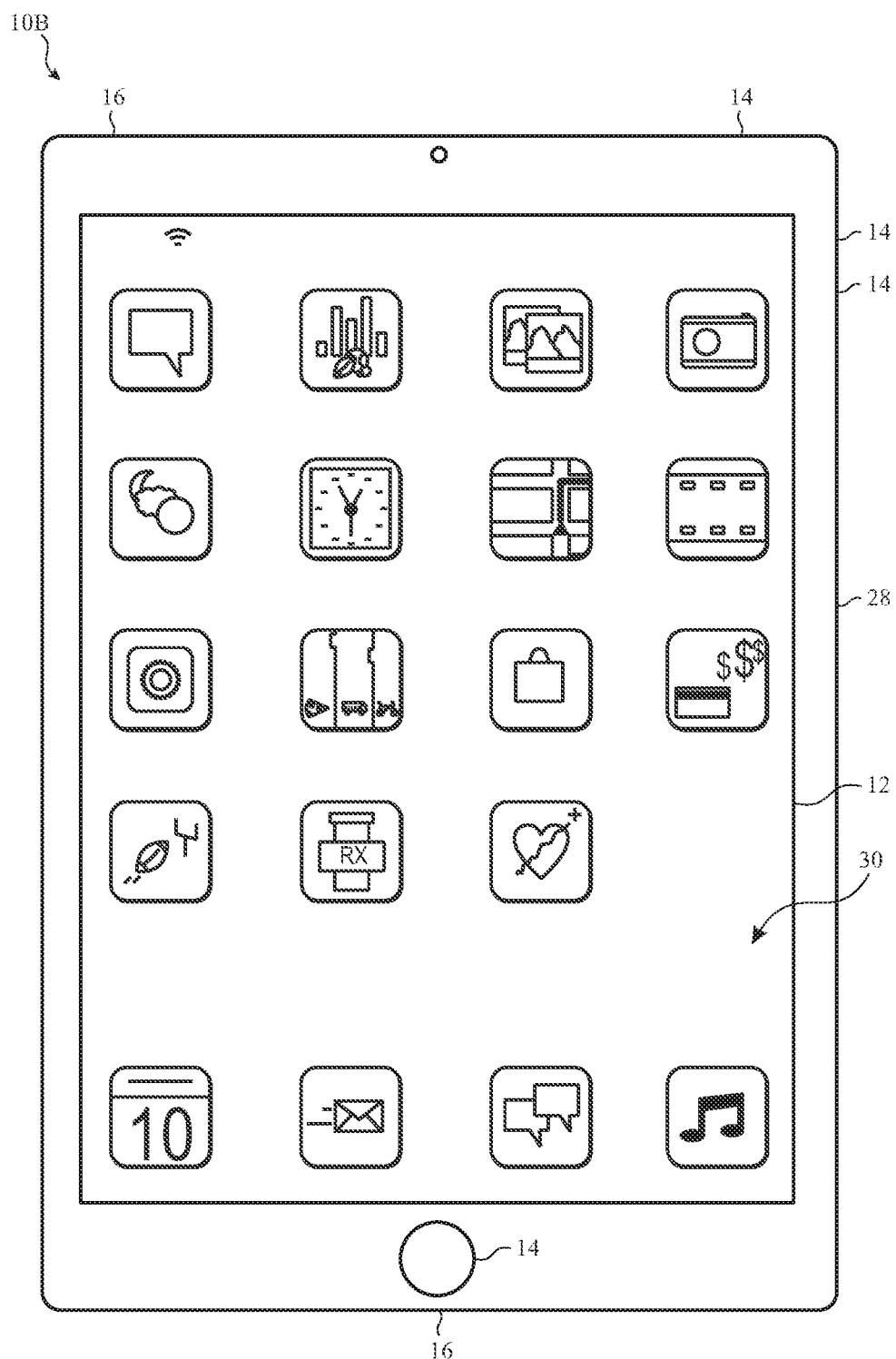
FIG. 3 is an example of the computing device of FIG. 1, in accordance with an embodiment.
Figure 4:
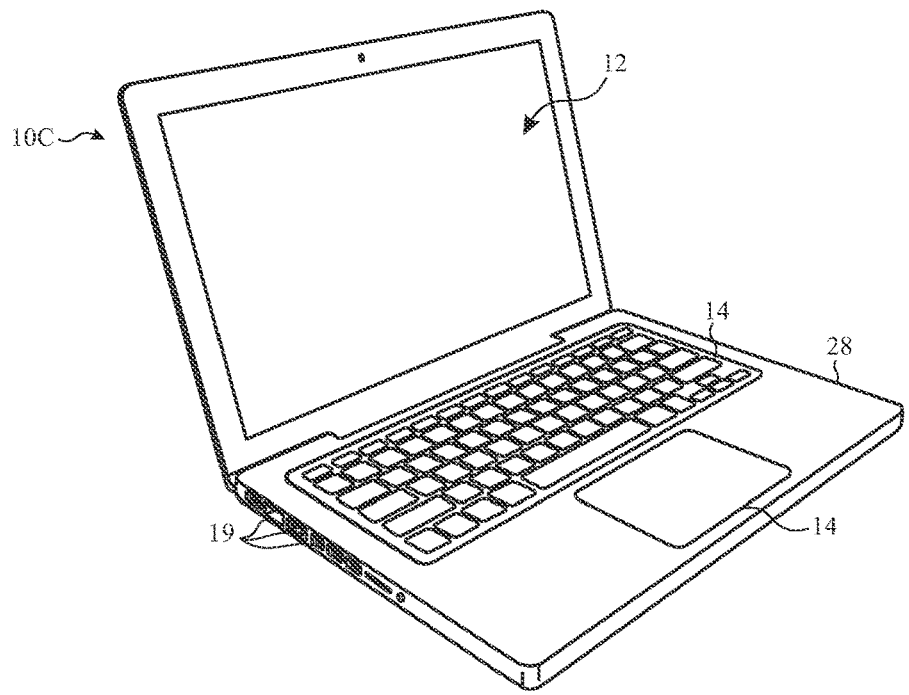
FIG. 4 is an example of the computing device of FIG. 1, in accordance with an embodiment.

To further illustrate a suitable computing device 10, a tablet device 10B is described in FIG. 3, such as any iPad model available from Apple Inc. Additionally, in other embodiments, the computing device 10 may take the form of a computer 10C as described in FIG. 4, such as any MacBook or iMac model available from Apple Inc. As depicted, the computer 10C also includes a display 12, input structures 14, I/O ports 16, and an enclosure 28.

As described above, the display 12 may facilitate communication of information between the computing device 10 and a user, for example, by displaying visual representations based on image data received from the processor 18 and detecting user touch on the surface of the display 12. To help illustrate, a portion 34 of the computing device 10 is described in FIG. 5. As depicted, the processor 18 and the display 12 are communicatively coupled via a data bus 36, which may enable the processor 18 to transmit image data to the display 12 indicating occurrence and/or position of a user touch to the processor 18.

Figure 6:
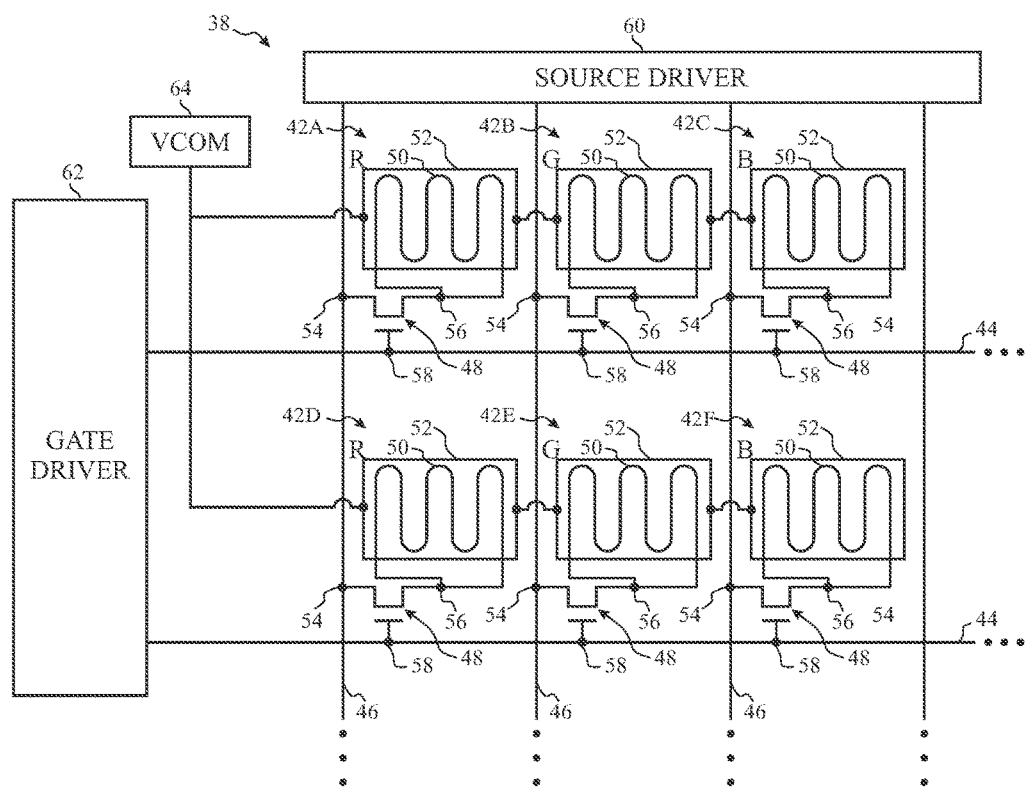
FIG. 6 is a schematic diagram of display components of an electronic display, in accordance with an embodiment.

To facilitate such operations, the display 12 may include display components (e.g., display driver circuitry) 38 and touch sensing components (e.g., touch sensing circuitry) 40. More specifically, the display components 38 may include any suitable components used to display an image frame on the display 12. For example, when the display 12 is a liquid crystal display, the display components 38 may include a thin film transistor (TFT) layer and a liquid crystal layer organized as display pixels. To help illustrate, operation of display components 38 used in a liquid crystal display are described in FIG. 6.

In the depicted embodiment, the display components 38 include a number of display pixels 42 disposed in a pixel array or matrix. More specifically, each display pixel 42 may be defined at the intersection of a gate line 44 (e.g. scanning line) and a source line 46 (e.g., data line). Although only six display pixels 42, referred to individually by the reference numbers 42A, 42B, 42C, 42E, and 42F, are shown for purposes of simplicity, it should be understood that in an actual implementation, each source line 46 and gate line 44 may include hundreds or thousands of such display pixels 42.

As described above, image data may be written to each of the display pixels 42 to display an image frame. More specifically, image data may be written to a display pixel 42 by using a thin film transistor 48 to selectively store an electrical potential (e.g., voltage) on a respective pixel electrode 50. Accordingly, in the depicted embodiment, each thin film transistor 48 includes a source 54, which is electrically connected to a source line 46, a drain 56, which is electrically connected to a pixel electrode 50, and a gate 58, which is electrically connected to a gate line 44.

Thus, to write image data to a row of display pixels 42 (e.g., 42A, 42B, and 42C), the corresponding gates may be activated (e.g., turned on) by a scanning signal on the gate line 44. Image data may then be written to the row of display pixels by storing an electrical potential corresponding with the grayscale value of the image data from the source lines 46 to the pixel electrode 50. The potential stored on the pixel electrode 50 relative to a potential of a common electrode 52 may then generate an electrical field sufficient to alter the arrangement of the liquid crystal layer (not shown). More specifically, this electrical field may align the liquid crystal molecules within the liquid crystal layer to modulate light transmission through the display pixel 42. In other words, as the electrical field changes, the amount of light passing through the display pixel 42 may increase or decrease. As such, the perceived brightness level of the display pixel 42 may be varied by adjusting the grayscale value of the image data. In this manner, an image frame may be displayed by successively writing image data the rows of display pixels 42.

To facilitate writing image data to the display pixels 42, the display components 38 may also include a source driver 60, a gate driver 62, and a common voltage (Vcom) source 64. More specifically, the source driver 60 may output the image data (e.g., as an electrical potential) on the source lines 46 to control electrical potential stored in the pixel electrodes 50. Additionally, the gate driver 62 may output a gate signal (e.g., as an electrical potential) on the gate lines 44 to control activation of rows of the display pixels 42. Furthermore, the Vcom source 64 may provide a common voltage to the common electrodes 52.

Figure 7:
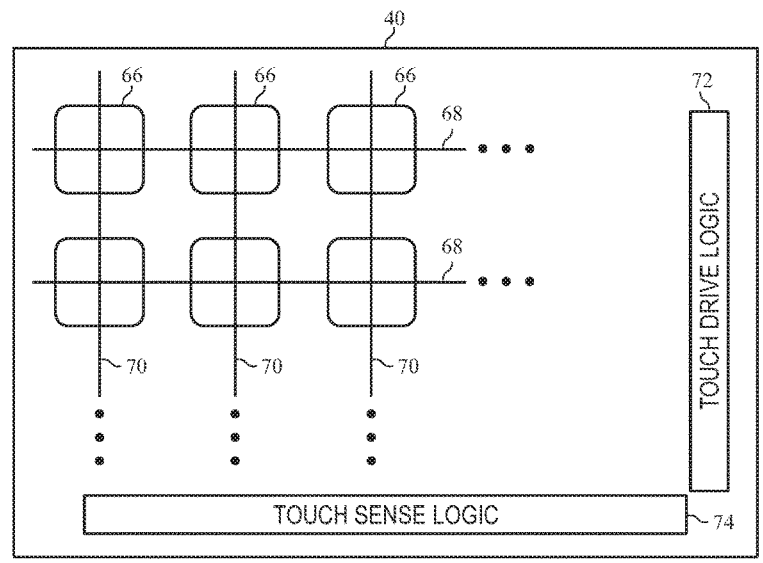
FIG. 7 is a schematic diagram of touch sensing components of the electronic display, in accordance with an embodiment.

Similarly, the touch sensing components 40 may include any suitable components used to detect occurrence and/or presence of a user touch on the surface of the display 12. To help illustrate, operation of touch sensing components 40 that may be used in a capacitive touch sensitive display 12 are described in FIG. 7.

In the depicted embodiment, the touch sensing components 40 include a number of touch pixels 66 disposed in a pixel array or matrix. More specifically, each touch pixel 66 may be defined at the intersection of a touch drive line 68 and a touch sense line 70. Although only six touch pixels 66 are shown for purposes of simplicity, it should be understood that in an actual implementation, each touch drive line 68 and touch sense line 70 may include hundreds or thousands of such touch pixels 66.

As described above, occurrence and/or position of a user touch may be detected based on impedance changes caused by the user touch. To facilitate detecting impedance changes, the touch sensing components 40 may include touch drive logic 72 and touch sense logic 74. More specifically, the touch drive logic 72 may output touch drive signals at various frequencies and/or phases on the touch drive lines 68. When an object, such as a user finger, contacts the surface of the display 12, the touch sense lines 70 may respond differently to the touch drive signals, for example by changing impendence (e.g., capacitance). More specifically, the touch sense lines 70 may generate touch sense signals to enable the touch sense logic 74 to determine occurrence and/or position of the object on the surface of the display 12.

In some embodiments, the touch sensing components 40 may utilize dedicated touch drive lines 68, dedicated touch sense lines 70, or both. Additionally or alternatively, the touch drive lines 68 and/or the touch sense lines 70 may utilize one or more of the display components 38. For example, the touch drive lines 68 and/or the touch sense lines 70 may be formed from one or more gate lines 44, one or more pixel electrodes 50, one or more common electrodes 52, one or more source lines 46, or any combination thereof.

Figure 5:
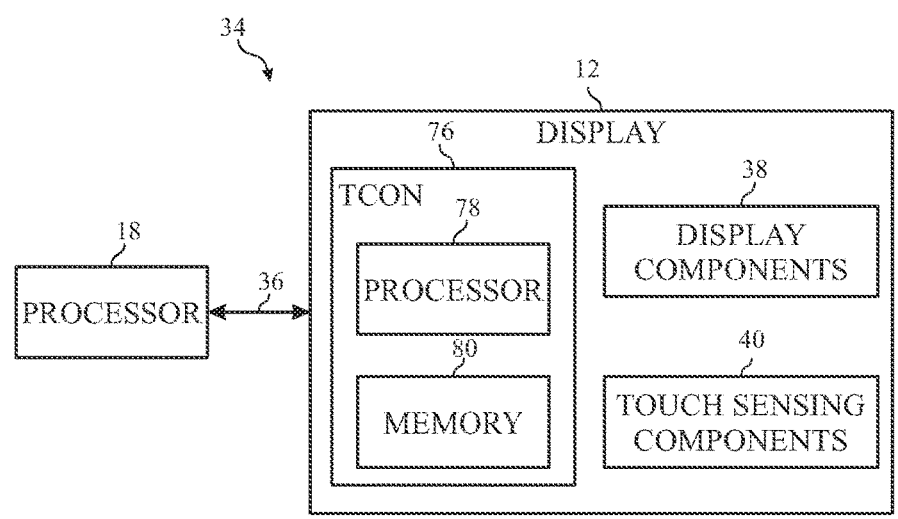
FIG. 5 is block diagram of a portion of the computing device of FIG. 1 used to display images and sense user touch, in accordance with an embodiment.

To facilitate controlling operation of both the display components 38 and the touch sensing components 40, the display 12 may include a timing controller (TCON) 76 as depicted in FIG. 5. Accordingly, the timing controller 76 may include a processor 78 and memory 80. More specifically, the processor 78 may execute instruction stored in memory 80 to perform operations in the display 12. Additionally, memory 80 may be a tangible, non-transitory, computer-readable medium that stores instructions executable by and data to be processed by the processor 78.

For example, the timing controller 76 may instruct the display components 38 to write image data to the display pixels 42 and instruct the touch sensing components 40 to check for a user touch. As described above, the frequency the touch sensing components 40 detects whether a user touch is present may be increased to improve the user touch detection accuracy. In fact, the timing controller 76 may utilize intra-frame pauses by alternating between instructing the display components 38 to write a portion of an image frame and instructing the touch sensing components 40 to check for a user touch.

Figure 8A:
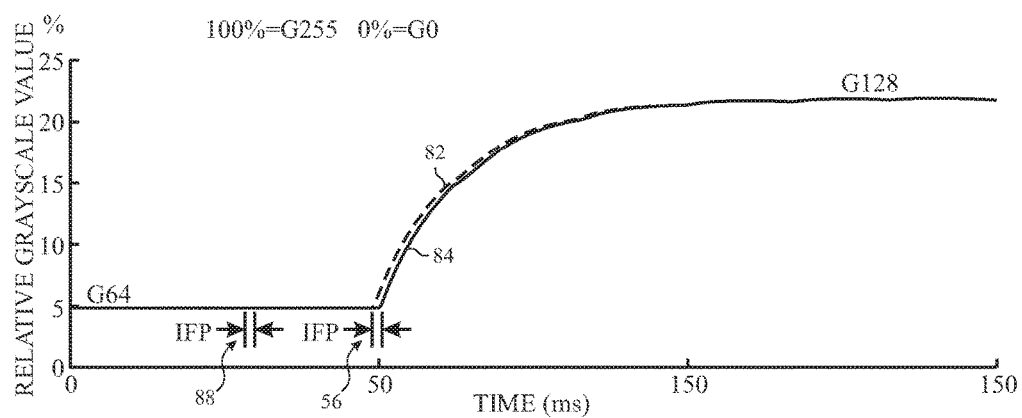
FIG. 8A is a plot of grayscale value of a pixel before an intra-frame pause compared to a pixel after the intra-frame pause, in accordance with an embodiment.

However, as described above, an intra-frame pause may also potentially cause a perceivable visual artifact, such as pixels being perceived at an undesired brightness level. To help illustrate, the grayscale value (e.g., brightness level) for two display pixels 42 in display 12 is described in FIG. 8A. More specifically, FIG. 8A is a plot that describes the grayscale value of a first pixel, which is written before an intra-frame pause, with a first grayscale curve 82 and the grayscale value of a second pixel, which is written after an intra-frame pause, with a second grayscale curve 84 over a period of operation between 0 to 150 ms, in which time is shown on the X-axis and relative grayscale value (e.g., brightness level) is shown on the Y-axis.

To simplify the following discussion, the techniques are described using image frames with a single intra-frame pause and with the same desired brightness level for each display pixel 42. In the depicted embodiment, the image frames displayed from 0 to 50 ms have a brightness level of 5% (e.g., grayscale value of 64). At 50 ms, the desired brightness level of the image frame is increased from the previously displayed image frames. As such, the grayscale value of the image data written to the first pixel and the second pixel are increased.

More specifically, as described by the first grayscale curve 82, the grayscale value of the image data written to the first pixel begins to be increased at 50 ms or very shortly thereafter. On the other hand, as described by the second grayscale curve 84, the grayscale value of the image data written to the second pixel begins to increase after an intra-frame pause 86, which may enable the display 12 to check for a user touch between writing image data to the first pixel and the second pixel. As depicted, the intra-frame pause 86 causes the grayscale value change of the second pixel to lag behind the first pixel. As such, the perceived brightness level of the second pixel may be less than the perceived brightness level of the first pixel.

Since an intra-frame pause is generally very short in duration (e.g., 1 or 2 ms), the intra-frame pause may only cause a perceivable brightness difference (e.g., visual artifact) when the desired brightness level is changing by more than a threshold amount. For example, in the depicted embodiment, another intra-frame pause 88 occurs at approximately 25 ms. However, since the desired brightness level is not changing, the intra-frame pause 88 does not cause a perceivable visual artifact. On the other hand, since the desired brightness level is changing at 50 ms, the intra-frame pause 86 may cause a perceivable visual artifact.

Figure 8B:
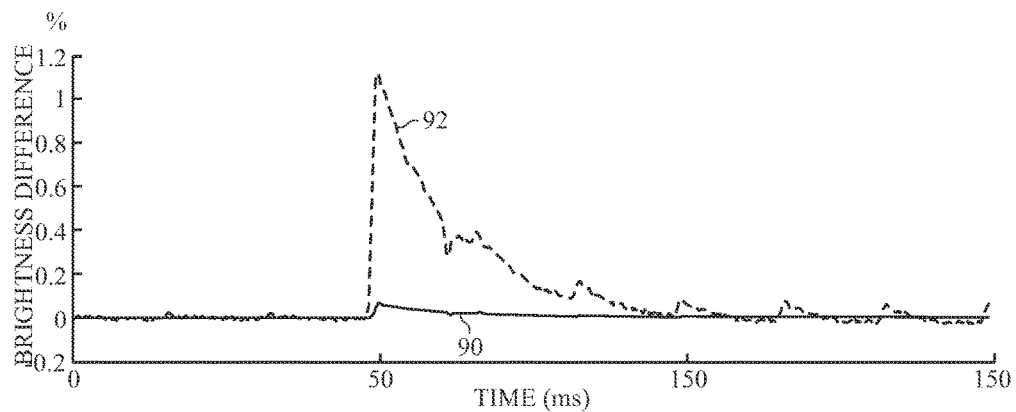
FIG. 8B is a plot of the difference between a target grayscale value and an actual grayscale value for the pixel before the intra-frame pause and the pixel after the intra-frame pause, in accordance with an embodiment.

To help illustrate, the grayscale value difference between the first pixel and the second pixel is described in FIG. 8B. More specifically, FIG. 8B is a plot that describes the difference between a target grayscale value and the grayscale value of the first pixel with a first difference curve 90 and difference between the target grayscale value and the grayscale value of the second pixel with a second difference curve 92 over the period of operation, in which time is shown on the X-axis and grayscale difference is shown on the Y-axis. As used herein, the "target grayscale value" may be the grayscale value of image data received from the image source. In other words, when the target grayscale value is written to a display pixel without an intra-frame pause, the display pixel may be at its desired brightness level.

As depicted, between 0 to 50 ms, the grayscale value of the first pixel and the second pixel are generally as desired. As such, the first pixel and the second pixel may be perceived at the desired brightness level. However, at 50 ms, both the first pixel and the second pixel vary from the target grayscale value. More specifically, as described by the first difference curve 90, even though the first pixel is written before the intra-frame pause 86, the grayscale value of the first pixel still varies slightly from the target grayscale value. In some embodiments, the difference may result from the less than instantaneous switching of the TFT in the first pixel and/or that the first pixel is not in the first row of display pixels 42. Nonetheless, the difference in grayscale value of the first pixel will generally not be perceivable by a user's eyes since it varies by less than 0.1% from the target grayscale value.

On the other hand, as described by the second difference curve 92, the intra-frame pause 86 causes the grayscale value of the second pixel to vary from the target grayscale value by approximately 1.2%. In other words, the second pixel may be more than 1.1% darker than the first pixel, which may be perceivable by a user's eyes. Furthermore, since the grayscale value of the second pixel does not catch up to the grayscale value of the first pixel until the grayscale values stop substantially changing (e.g., at 100 ms), the intra-frame pause 86 may cause a perceivable artifact at the second pixel from 50 ms until close to 100 ms.

As discussed above, a visual artifact may be perceivable when an intra-frame pause causes the perceived brightness level of a pixel after the intra-frame pause (e.g., the second pixel) to vary from the desired brightness level by a perceivable amount. These artifacts may be accentuated when the intra-frame pauses for successive frames occur in common location in the image frame. Accordingly, intra-frame pauses may be introduced at varied times during the frame rendering process.

Figure 9:
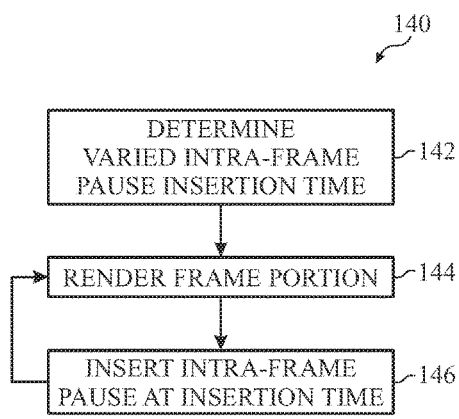
FIG. 9 is a flowchart illustrating a process for using rolling varied-time intra-frame pauses, in accordance with an embodiment.

Referring now to FIG. 9, a process 140 for rolling time insertion of intra-frame pauses is provided. The process 140 may be implemented via one or more processors that receive processor-readable instructions from a tangible, non-transitory machine-readable medium. The process 140 begins with determining a varied (e.g., rolling) intra-frame pause insertion time (block 142). For example, varied intra-frame pause insertion times may be determined by an algorithm or other hardware. In one example, varied intra-frame pause insertion times may be determined according to the process 160 of FIG. 10, as will be discussed in more detail below.

Once the intra-frame pause insertion times are determined, frame rendering may begin by rendering a portion of the frame (block 144). Once the intra-frame pause insertion time is reached, frame rendering is paused, resulting in the insertion of the intra-frame pause (block 146). Upon completion of the intra-frame pause, a subsequent portion of the frame may be rendered (block 144). This process may continue until each of the intra-frame pauses is complete and the entire frame is rendered. At that point, the process 140 may continue, rendering the next successive frame and the corresponding intra-frame pauses.

Figure 10:
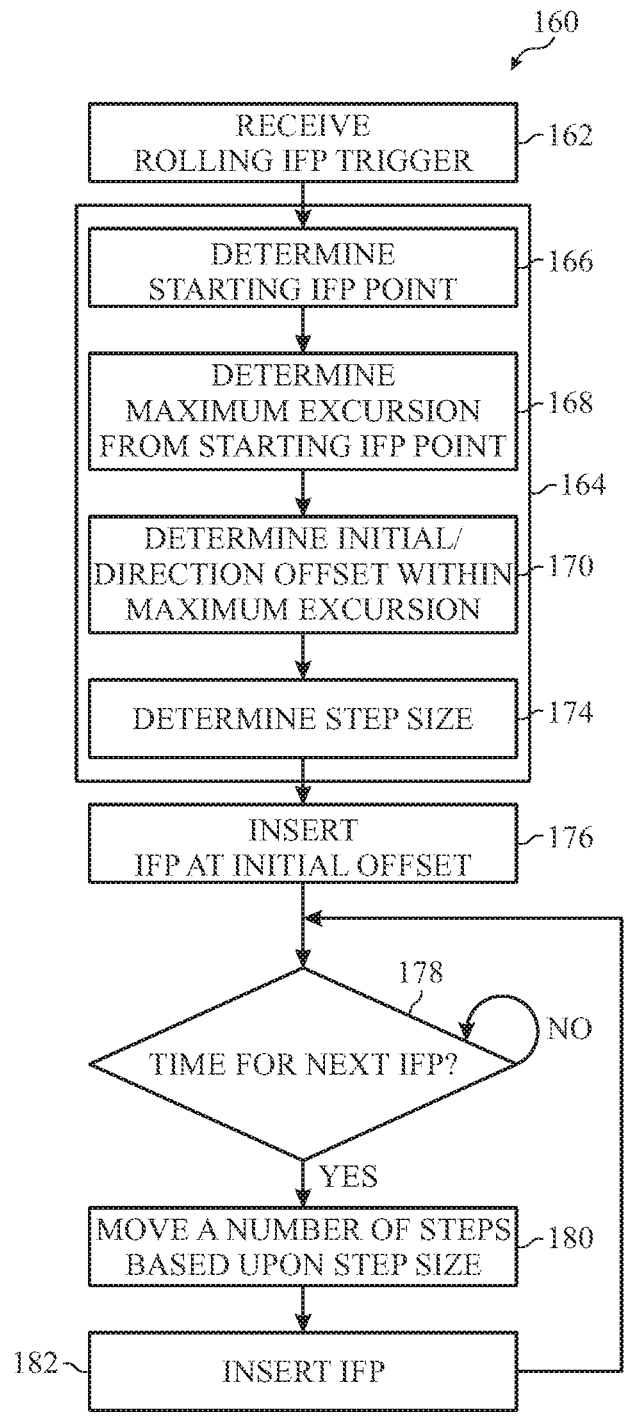
FIG. 10 is a flowchart illustrating a process for inserting rolling intra-frame pauses, in accordance with an embodiment.

FIG. 10 is a process 160 for determining rolling intra-frame pause insertion times, in accordance with an embodiment. The process 160 begins by triggering the rolling intra-frame pause insertion time determination (block 162). In certain embodiments, determination of the intra-frame pause insertion time may be triggered by activation of the electronic display 12. Thus, a new set of insertion times may be determined each time the electronic display 12 transitions from off to on. Additionally or alternatively, new insertion times may be determined on a defined periodic basis (e.g., every 10 minutes, etc.).

Rolling insertion parameters may be accessed (block 164). For example, a programmed starting point for the insertion time for the intra-frame pause may be determined (block 166). The programmed starting point may provide an initial timing where rolling insertion time determination should be started from. For example, this starting point may be centered in a sub-frame region, where an inter-frame pause is desired.

Further, a maximum excursion value may be accessed (block 168). The maximum excursion value may provide an indication of incrementing and decrementing bounds for intra-frame pauses, in relation to the programmed starting point. For example, in some embodiments, a maximum excursion value of 10 may indicate that the intra-frame pause may be implemented at a +/−10 unit position. Alternatively, in some embodiments, the maximum excursion value may represent a full range of excursion, both incrementing and decrementing. Thus, in one example of such an embodiment, a maximum excursion value of 10 may indicate that the intra-frame pause may be implemented at a +/−5 unit position (5 for incrementing and 5 for decrementing, equaling a total range of 10.

An initial offset value and direction may also be determined (block 170). The initial offset value may indicate an initial number of unit steps to diverge from the programmed starting intra-frame pause point. The initial direction may indicate whether to increment or decrement a position for the offset. Accordingly, in one example, when the intra-frame starting point is 10, the initial offset is 3 and the initial direction is decrementing, the offset intra-frame pause insertion time becomes 10−3=7.

In situations where the initial offset would result in an insertion time outside of the maximum excursion range, the offset value may either rebound step (step in reverse upon reaching the end of the maximum excursing range) or wrap step (wrap to the opposite end of the maximum excursion range, maintaining the same direction). For example, if the maximum excursion was +/−4, the initial offset was 6, the direction was decrementing, and staring point was 10, if rebound stepping was implemented, the offset intra-frame pause insertion time would be 10 (the starting point)−4 (the maximum excursion boundary)+2 (the remaining offset in the reverse direction)=8. In some embodiments, the excursion boundaries may be counted as two offsets, one for each direction encountered at the boundary. In such embodiments, the offset intra-frame pause insertion time would be 7. In embodiments where wrap stepping is implemented, the intra-frame pause insertion time would be calculated by starting at the starting point (10), offsetting until a maximum excursion boundary is reached (offset of −4), moving to the opposite maximum excursion boundary (14) and continuing to offset in the same direction for the remainder of the offset (−2). Accordingly, the intra-frame pause insertion time would be 12.

A step size may be determined from the rolling parameters as well (block 174). The step size may be used to determine where subsequent intra-frame pauses will be placed in subsequent frames, as will be discussed in more detail below.

An initial intra-frame pause may be inserted at the offset intra-frame pause insertion time (block 176). Additional intra-frame pauses may be inserted in a rolling manner. A determination may be made as to when additional intra-frame pauses should be inserted (decision block 178). For example, the next intra-frame pause insertion time may move based upon the step-size (block 180) and the intra-frame pause may be inserted at the new insertion time (block 182).

Figure 11:
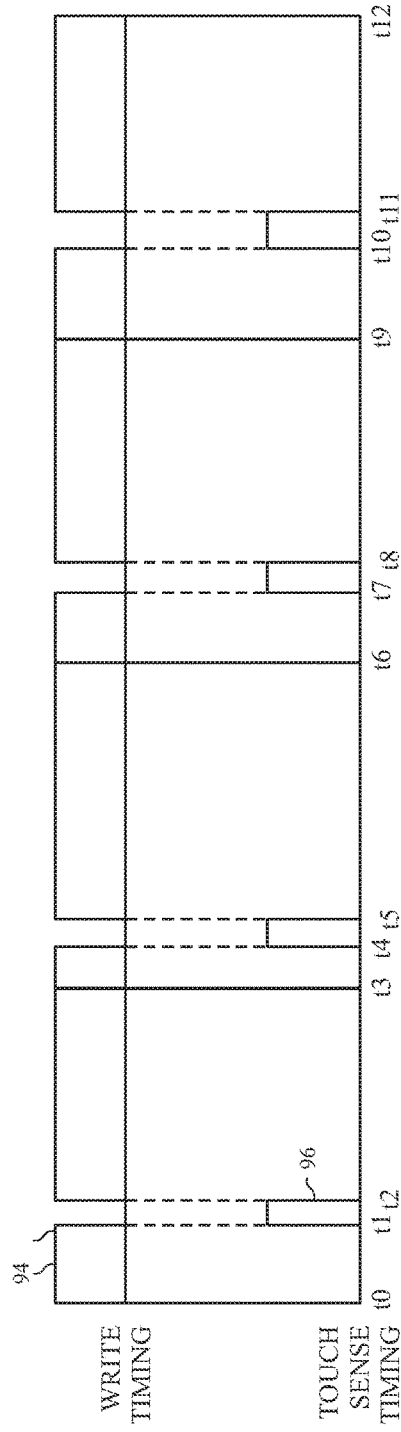
FIG. 11 is a timing diagram illustrating rolling insertion of intra-frame pauses within the rendering of successive frames, in accordance with an embodiment.

To help illustrate an embodiment of rolling insertion of intra-frame pauses, a timing diagram illustrating the operation of the electronic display 12 is described in FIG. 11. More specifically, FIG. 11 describes operation of the display components 38 with a write timing plot 94 and operation of the touch sensing components 40 with a touch sensing timing plot 96 during a period when three image frames are displayed.

For the purpose of description, a first image frame is written between t0 and t3, a second image frame is written between t3 and t6, a third image frame is written between t6 and t9, and a fourth image frame is written between t9 and 12. In the depicted embodiment, each image frame may be written in two separate portions separated by an intra-frame pause. In alternative embodiments, each image frame may be written in additional separate portions separated by additional intra-frame pauses. For example, between t0 and t1, the timing controller 76 may instruct the display components 38 to write a first portion of the first image frame to a corresponding portion of the pixels 42. Between t1 and t2, the timing controller 76 may instruct the display components 38 to pause writing the first image frame and instruct the touch sensing components 40 to check for a user touch. Between t2 and t3, the timing controller 76 may instruct the display components 38 to write the second portion of the first image frame to the corresponding pixels 42, resulting in the completed rendering of the first image frame. Between t3 and t4, the timing controller 76 may instruct the display components 38 to write a first portion of the second image frame to a corresponding set of the pixels 42. Between t4 and t5, the timing controller 76 may again instruct the display components 38 to pause writing the second image frame and instruct the touch sensing components 40 to check for a user touch. Between t5 and t6, the timing controller 76 may instruct the display components 38 to write the remaining portion of the second image frame to a corresponding set of the pixels 42. Between t6 and t7, the timing controller 76 may instruct the display components 38 to write a first portion of the third image frame to a corresponding portion of the pixels 42. Between t7 and t8, the timing controller 76 may instruct the display components 38 to pause writing the third image frame and instruct the touch sensing components 40 to check for a user touch. Between t8 and t9, the timing controller 76 may instruct the display components 38 to write the second portion of the third image frame to the corresponding pixels 42, resulting in the completed rendering of the third image frame. Between t9 and t10, the timing controller 76 may instruct the display components 38 to write a first portion of the fourth image frame to a corresponding portion of the pixels 42. Between t10 and t11, the timing controller 76 may instruct the display components 38 to pause writing the fourth image frame and instruct the touch sensing components 40 to check for a user touch. Between t11 and t12, the timing controller 76 may instruct the display components 38 to write the second portion of the fourth image frame to the corresponding pixels 42, resulting in the completed rendering of the fourth image frame As described above, an intra-frame pause may occur when the display 12 pauses writing an image frame to check for a user touch. Accordingly, the time periods from t1 to t2, t4 to t5, t7 to t8, and t10 to t11 may each be referred to as an intra-frame pause. As depicted, the intra-frame pauses enable the frequency with which the display 12 checks for a user touch to be increased. For example, in the depicted embodiment, the display 12 may check for a user touch one time during the time period one image frame is written. Generally, the number intra-frame pauses used may be based on desired user touch detection accuracy. For example, the number of intra-frame pauses may be increased to improve user touch detection accuracy. As such, writing of an image frame may be divided by any suitable manner (e.g., 1, 2, 3, 4, 5, or more intra-frame pauses).

As mentioned above, the perception of artifacts resulting from intra-frame pauses may be reduced by varying insertion time of the intra-frame pauses. The insertion of the intra-frame pauses may be varied by rolling from pause-to-pause and/or frame-to-frame. For example, in some embodiments, the insertion times to insert intra-frame pauses into the frame renderings may be determined according to the process 160 of FIG. 10. The rolled timing of the insertion of intra-frame pauses may reduce the likelihood of a visual artifact being perceived, by distributing these artifacts to varied locations in the successive frames.

Figure 12:
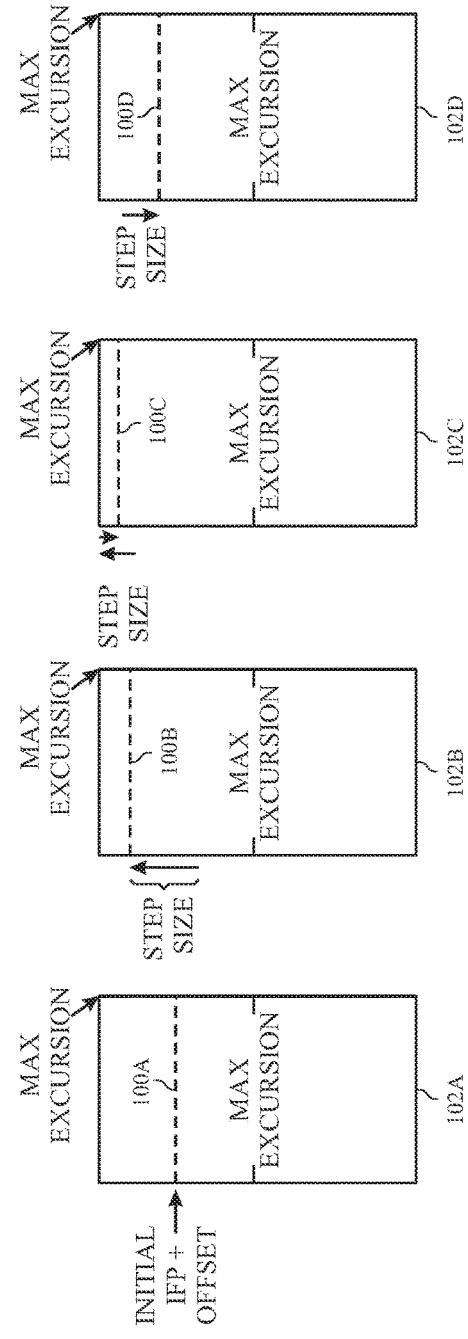
FIG. 12 illustrates the placement of intra-frame pauses in the successive frames, based upon the timings of FIG. 11, in accordance with an embodiment.

FIG. 12 illustrates a positioning of the intra-frame pauses 100A-D within successive frames 102A-D, where the intra-frame pause insertion point is varied by rolling to reduce perceptibility of artifacts associated with these pauses, in accordance with an embodiment. As illustrated, because the intra-frame pause timings (e.g., t1 to t2, t4 to t5, t7 to t8, and t10 to t11 in FIG. 11) are varied, the intra-frame pauses 100A-D are inserted at varied locations in the rendering of the frames 102A-102. By varying the timing of the intra-frame pause insertions, artifacts from these insertions may be less perceivable by the human eye.

As mentioned above, the rolling intra-frame pause insertion times may be derived using a set of rolling parameters, such as an initial intra-frame pause starting point, an offset from the starting point, a step size, and a direction parameter. These parameters may be stored and supplied by non-volatile memory of an electronic device and may be static or dynamically changed. As illustrated in FIG. 12, the initial intra-frame pause 100A may be inserted based upon the initial intra-frame pause starting point added to the initial offset value. Further, subsequent intra-frame pause insertion points may be bounded by a maximum excursion value from the initial intra-frame pause. The movement of the intra-frame pause in subsequent frames (e.g., 102B, 102C, and 102D) may be determined based upon the step size and direction for the next intra-frame pause. For example, in the embodiment depicted in FIG. 12, the direction may be set to decrement (as opposed to increment). Accordingly, intra-frame pause insertion times for the next frame may be earlier in the frame rendering, as illustrated by intra-frame pause 100B of frame 102B.

As discussed above, when the maximum excursion boundary is reached, intra-frame pause insertion time movement may rebound or wrap. In the current embodiment, in frame 102C, the step size is larger than the distance between the previous intra-frame pause and the maximum excursion. As illustrated in frame 102C, the embodiment of FIG. 12 employs rebounding, which results in a direction shift and continued offset movement, once the maximum excursion is reached.

Because the direction has shifted to incrementing, in frame 102D, the intra-frame pause 100D occurs later in the rendering of frame 102D than the subsequent intra-frame pause 100C in the rendering of frame 102C.

Figure 13:
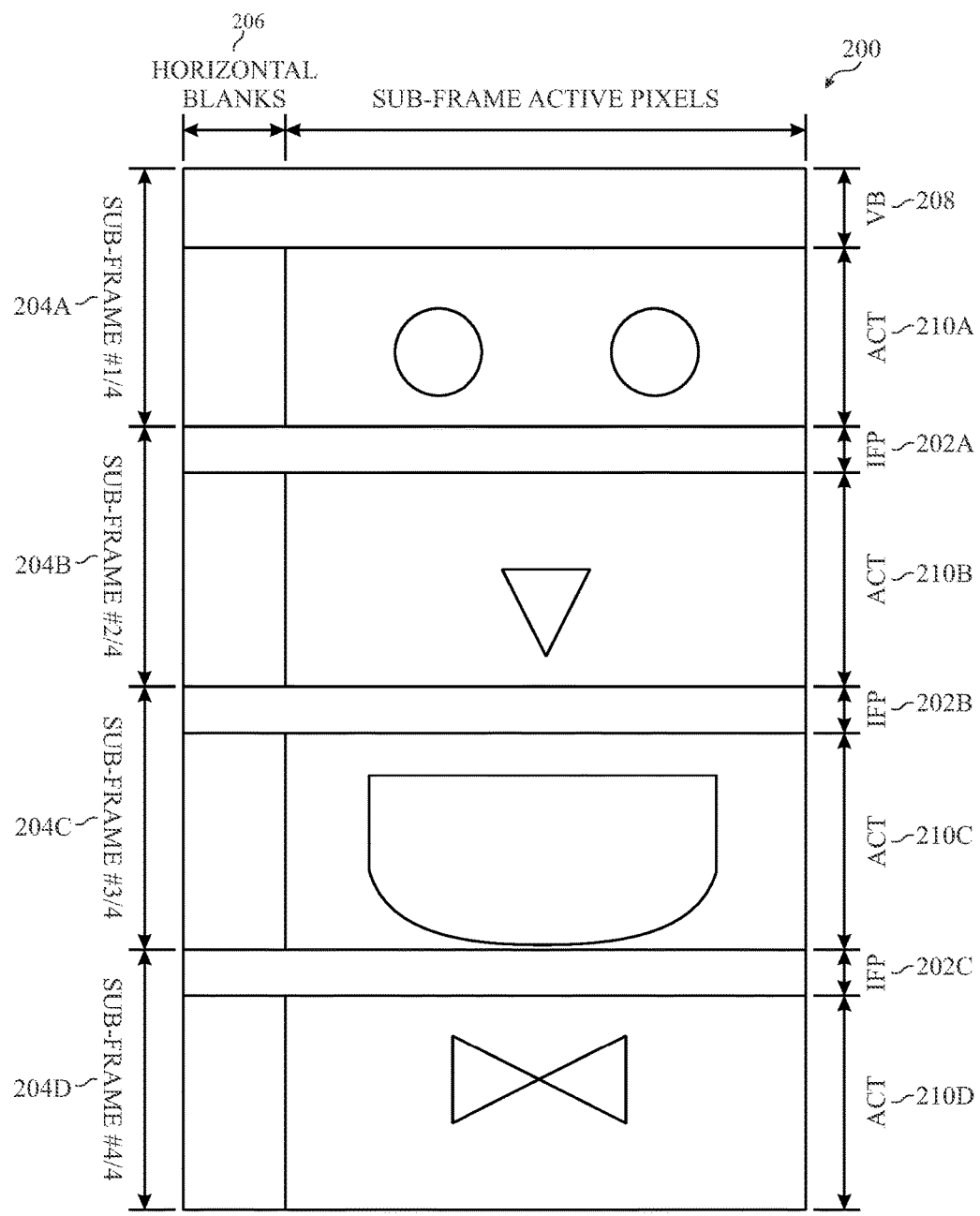
FIG. 13 illustrates a frame of image data, where multiple intra-frame pauses are incorporated, in accordance with an embodiment.
Figure 14:
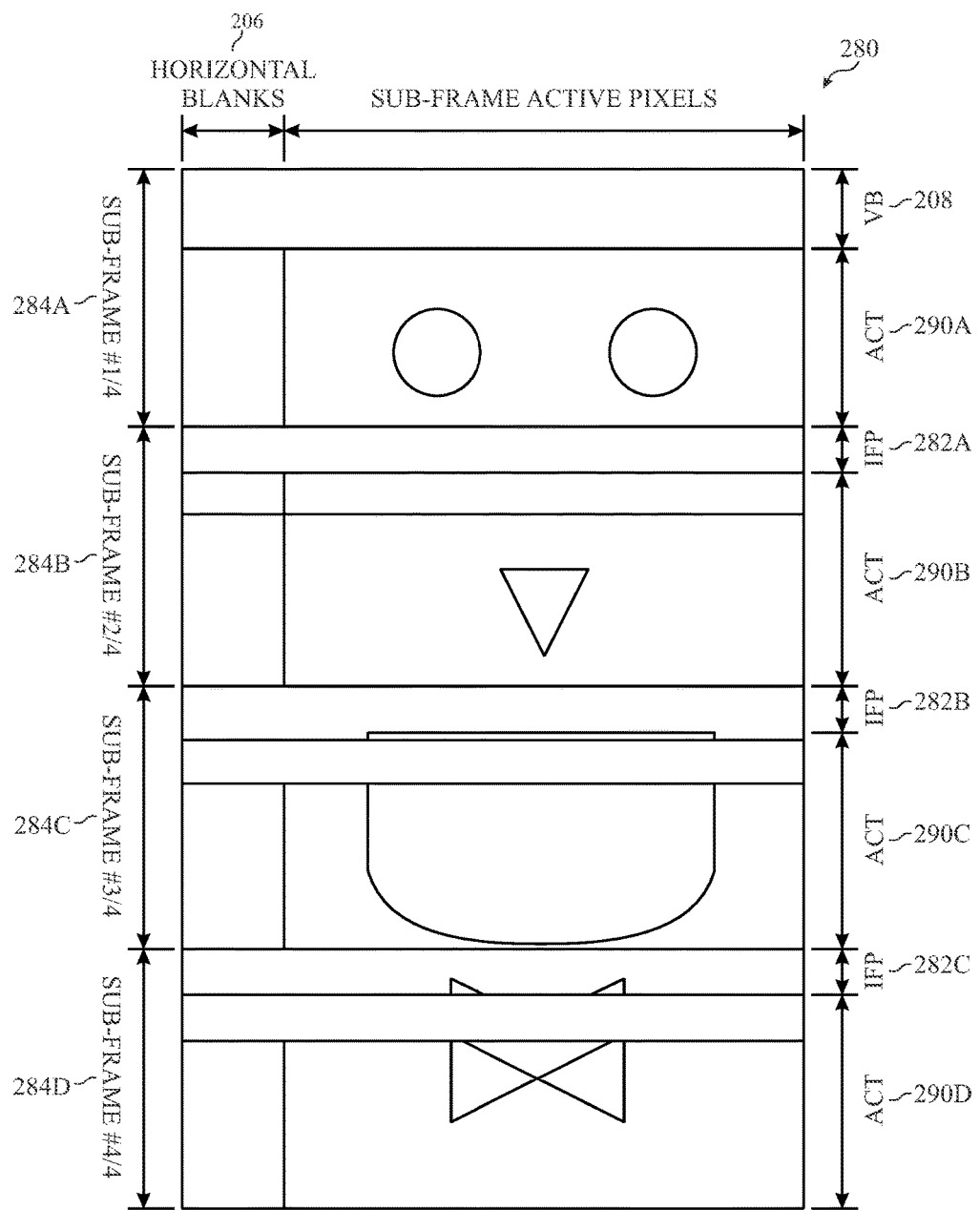
FIG. 14 illustrates a successive frame of the frame of FIG. 13, where intra-frame pauses have rolled to a new position, in accordance with an embodiment.

FIGS. 13 and 14 illustrate successive frames 200 and 280 where rolling intra-frame pauses are utilized, in accordance with an embodiment. As illustrated in FIG. 13, three intra-frame pauses 202A, 202B, and 202C are inserted in between four sub-frames 204A, 204B, 204C, and 204D. Additionally, horizontal blanking periods 206 and/or vertical blanking periods 208 may be inserted for display processing. In between the vertical blanking periods 208 and the intra-frame pauses 202A, 202B, and 202C, active frame data may be displayed, as illustrated by active frame portions 210A, 210B, 210C, and 210D. Similarly, in the sub-frames 284A, 284B, 284C, and 284D of FIG. 14, in between the vertical blanking periods 208 and the subsequent intra-frame pauses 282A, 282B, and 282C, active frame data may be displayed, as illustrated by active frame portions 290A, 290B, 290C, and 290D.

The intra-frame pauses 202A, 202B, and 202C may be varied by rolling, by moving the intra-frame pause insertion times by a step size in a particular direction. In the current embodiment, the direction is set to increment. Thus, as illustrated in FIG. 14, the insertion times for subsequent intra-frame pauses 282A, 282B, and 282C are later in time of the frame rendering than those of the rendering of frame 200, as determined by the step size. In the current embodiment, the same rolling parameters are used for each of the sub-frames, resulting in multiple intra-frame pauses per frame that move in conjunction with one other. In alternative embodiments, different parameters may be used for one or more of the sub-frames 204A, 204B, 204C, and/or 204D, which would result in independent movement of one or more of the subsequent intra-frame pauses 282A, 282B, and/or 282C of FIG. 14.

As described herein, the technical effects of the present disclosure include improving user touch detection accuracy in an electronic display through the use of intra-frame pauses while reducing perceivable visual artifacts. More specifically, the electronic display may use intra-frame pauses to check for a user touch at a higher frequency. Additionally, the likelihood of perceivable artifacts being generated from the intra-frame pauses may be reduced by varying the insertion timing of the intra-frame pauses.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic display, comprising:
    display driver circuitry configured to display at least a first image frame and a second image frame on the electronic display using at least a first display pixel and a second display pixel;
    touch sensing circuitry configured to detect user interaction with the electronic display; and
    a timing controller configured to:
        determine a step size;
        determine at least a first insertion time for a first intra-frame pause for the first image frame and a second insertion time for a second intra-frame pause for the second image frame, wherein the second insertion time is determined by incrementing or decrementing the first insertion time using the step size, wherein the first intra-frame pause and the second intra-frame pause are periods where the display driver circuitry is configured to pause rendering of image data to allow the touch sensing circuitry to detect the user interaction;
        insert the first intra-frame pause during rendering of the first image frame at the first insertion time; and
        insert the second intra-frame pause during rendering of the second image frame at the second insertion time.

2. The electronic display of claim 1, wherein the timing controller is configured to determine the first insertion time by accessing an initial intra-frame pause starting point.

3. The electronic display of claim 2, wherein the timing controller is configured to determine the first insertion time by:
    accessing an offset parameter indicating an offset from the initial intra-frame pause starting point; and
    setting the first insertion time based upon the offset.

4. The electronic display of claim 3, wherein the timing controller is configured to:
    determine a direction parameter, the direction parameter indicating either incrementing or decrementing;
    when the direction parameter indicates incrementing:
        setting the second insertion time to equal the first insertion time plus the step size; and
    when the direction parameter indicates decrementing:
        setting the second insertion time to equal the first insertion time minus the step size.

5. The electronic display of claim 4, wherein the timing controller is configured to:
    determine a maximum excursion range; and
    when setting the second insertion time to equal the first insertion time to be greater than or less than the step size would result in the second insertion time being outside the maximum excursion range, modifying the second insertion time to remain within the maximum excursion range.

6. The electronic display of claim 5, wherein the timing controller is configured modify the second insertion time to remain within the maximum excursion range by rebounding at a boundary of the maximum excursion range, wherein the rebounding comprises:
  when the boundary in reached by a first portion of the step size and a remaining portion of the step size exists, flipping the direction parameter from incrementing to decrementing or from decrementing to incrementing; and
  moving the remaining portion of the step size in the flipped direction parameter.

7. The electronic display of claim 5, wherein the timing controller is configured modify the second insertion time to remain within the maximum excursion range by wrapping at a boundary of the maximum excursion range, wherein the wrapping comprises:
  when the boundary is reached by a first portion of the step size and a remaining portion of the step size exists, resuming moving the second insertion time from an opposite boundary of the maximum excursion range in a common direction for the remaining portion of the step size.

8. The electronic display of claim 1, wherein the timing controller, during the first intra-frame pause and the second intra-frame pause, is configured to instruct the display driver circuitry to stop writing image data to display pixels while the touch sensing circuitry determines whether a user touch is present on a surface of the electronic display.

9. The electronic display of claim 1, wherein the touch sensing circuitry comprise a touch sensing pixel configured to detect presences and position of a user touch based at least in part on an impedance change at the touch sensing pixel.

10. The electronic display of claim 1, wherein the timing controller is configured to:
  determine a first set of insertion times for at least two intra-frame pauses for a single image frame; and
  insert the at least two intra-frame pauses during rendering of the single image frame at the first set of insertion times.

11. The electronic display of claim 10, wherein the timing controller is configured to:
  determine a second set of insertion times for at least two subsequent intra-frame pauses for a subsequent single image frame by stepping from the first set of insertion times to the second set of insertion times based upon a pre-determined step size; and
  insert the at least two subsequent intra-frame pauses during rendering of the subsequent single image frame at the second set of insertion times; wherein the first set of insertion times and the second set of insertion times are varied from one another by the pre-determined step size.

12. A tangible, non-transitory, computer readable medium storing instructions executable by a processor of an electronic display configured to display an image frame, wherein the instructions comprise instructions to:
  determine a step size;
  determine a first insertion time for an intra-frame pause from rendering the image frame, wherein a subsequent intra-frame pause for at least one subsequent frame is determined by incrementing or decrementing the first insertion time by the step size;
  receive, using the processor, image data corresponding with the image frame;
  instruct, using the processor, the electronic display to write a portion of the image data to display pixels in the electronic display to display a portion of the image frame;
  upon reaching the first insertion time, instruct, using the processor, the electronic display to pause writing the image data once the portion of the image frame is displayed;
  upon completion of the intra-frame pause, instruct, using the processor, the electronic display to write a remaining portion of the image data to the display pixels;
  instruct, using the processor, the electronic display to write a portion of a subsequent frame of image data to the display pixels in the electronic display to display a portion of the subsequent frame of image data;
  upon reaching the subsequent insertion time, instruct, using the processor, the electronic display to pause writing of the subsequent frame of image data once the portion of the subsequent frame of image data is displayed; and
  upon completion of the subsequent intra-frame pause, instruct, using the processor, the electronic display to write a remaining portion of the subsequent frame of image data to the display pixels.

13. The computer readable medium of claim 12, comprising instructions to instruct, using the processor, the electronic display to:
  determine an initial starting point and offset;
  apply the offset to the initial starting point, to derive an offset initial starting point; and
  set the first insertion time to the initial starting point with the offset applied.

14. The computer readable medium of claim 12, comprising instruction to instruct, using the processor, the electronic display to:
  determine a direction parameter, the direction parameter indicating either incrementing or decrementing;
  when the direction parameter indicates incrementing: set the subsequent insertion time to equal the first insertion time plus the step size; and
  when the direction parameter indicates decrementing: set the subsequent insertion time to equal the first insertion time minus the step size.

15. The computer readable medium of claim 12, comprising instructions to instruct, using the processor, the electronic display to:
  determine a maximum excursion range; and
  when the subsequent insertion time would result in the subsequent insertion time being outside the maximum excursion range, modifying the subsequent insertion time to remain within the maximum excursion range by either rebounding or wrapping, from a boundary of the maximum excursion range, a portion of the step size that would be outside the maximum excursion range.

16. A method, comprising:
  accessing, via a processor, a pre-determined step size;
  writing a first portion of display pixels on an electronic display to display a first portion of a first image frame;
  pausing writing of the display pixels at a first intra-frame pause time to receive a first user input during the first intra-frame pause time via a user input device;
  upon completion of the first intra-frame pause time, writing a second portion of the display pixels to display a second portion of the first image frame;
  upon completion of writing the first image frame, writing a first portion of the display pixels to display a first portion of a second image frame;
  pausing writing of the display pixels at a second intra-frame pause time, to receive a second user input during the second intra-frame pause time via the user input device; and upon completion of the second intra-frame pause time, writing a second portion of the display pixels to display a second portion of the second image frame;

wherein the second intra-frame pause time for the second frame is determined by incrementing or decrementing the first intra-frame pause time for the first frame using the pre-determined step size.

17. The method of claim 16, wherein the pre-determined step size may vary upon subsequent accesses and wherein the pre-determined step size is accessed each time the display is turned on from an off state.

18. The method of claim 16, comprising:
wherein the pre-determined step size may vary upon subsequent accesses and wherein the pre-determined step size is accessed at a periodic interval.

19. The method of claim 16, comprising:
accessing an initial starting point and an offset parameter;
setting the first intra-frame pause time as the initial starting point offset by the offset parameter;
accessing a direction parameter indicative of incrementing or decrementing;
accessing a maximum excursion range;
when the direction parameter is indicative of incrementing:
setting the second intra-frame pause time as the first intra-frame pause time plus the pre-determined step size, if the first intra-frame pause time plus the pre-determined step size is not outside the maximum excursion range;
otherwise setting the second intra-frame pause time by rebounding or wrapping a remaining portion of the pre-determined step size at a boundary of the maximum excursion range; and
when the direction parameter is indicative of decrementing:
setting the second intra-frame pause time as the first intra-frame pause time minus the pre-determined step size, if the first intra-frame pause time minus the pre-determined step size is not outside the maximum excursion range;
otherwise setting the second intra-frame pause time by rebounding or wrapping the remaining portion of the pre-determined step size at the boundary of the maximum excursion range.

20. The method of claim 19, comprising:
accessing the initial starting point, the offset parameter, the direction parameter, and the maximum excursion range each time the display is turned on.

* * * * *

UNITED STATES PATENT AND TRADEMARK OFFICE
CERTIFICATE OF CORRECTION

PATENT NO. : 10,261,632 B2
APPLICATION NO. : 15/655560
DATED : April 16, 2019
INVENTOR(S) : Peter F. Holland et al.

Page 1 of 1

It is certified that error appears in the above-identified patent and that said Letters Patent is hereby corrected as shown below:

On the Title Page

Item (60), Line 1, replace "62/398,391" with --62/398,381--.

Signed and Sealed this
Twenty-first Day of January, 2020

Andrei Iancu
*Director of the United States Patent and Trademark Office*